United States Patent [19]
Vosyka et al.

[11] 4,323,033
[45] Apr. 6, 1982

[54] MOBILE ARRANGEMENT FOR A GROUP STABLING AND HANDLING OF FARM ANIMALS

[75] Inventors: Josef Vosyka, Cernosice; Jiří Skoda, Chocen, both of Czechoslovakia

[73] Assignee: Vyzkumny ustav zivocisne vyroby Uhrineves, Prague, Czechoslovakia

[21] Appl. No.: 235,745

[22] Filed: Feb. 18, 1981

[51] Int. Cl.³ .............................................. A01K 1/12
[52] U.S. Cl. .................................... 119/14.04; 119/16
[58] Field of Search ..................... 119/14.04, 14.03, 16

[56] References Cited

U.S. PATENT DOCUMENTS 3,460,515  8/1969  Page et al. ........................ 119/14.04
3,810,422  5/1974  Jacobs et al. ..................... 119/14.04
4,261,292  4/1981  Le Du ............................... 119/14.04

Primary Examiner—Hugh R. Chamblee

[57] ABSTRACT

A mobile arrangement for a group stabling and treatment of farm animals, especially of milk cows, in rectangular large-capacity cow-houses, in which animals are confiningly stabled and transported for milking. The arrangement combines the advantages of confining systems and free stabling; it permits a maximum degree of mechanization and automation, and it obviates some of the drawbacks of prior systems. In two cow-house bays which are mirror images of each other, and which are separated one from the other by a milking station and a gridded channel for receiving dung, there are disposed in each bay rails for seating movable platforms with individual stabling stands limited by box railings. The platforms in each bay move in paths which are a mirror image of the other; the platforms of the two bays move in parallel paths in the same direction on opposite sides of the milking and treating stations, as well as on opposite sides of the gridded channel.

8 Claims, 18 Drawing Figures

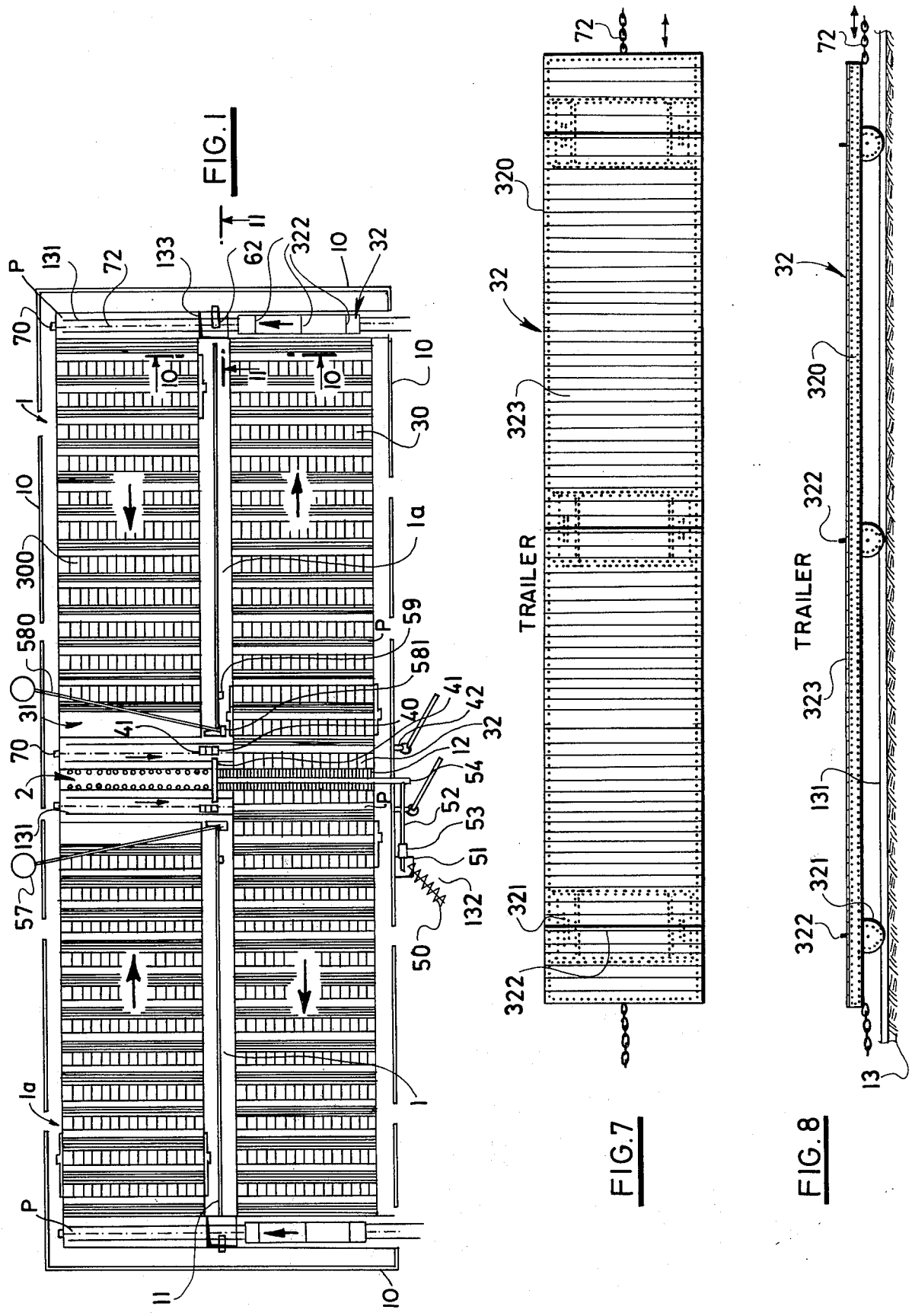

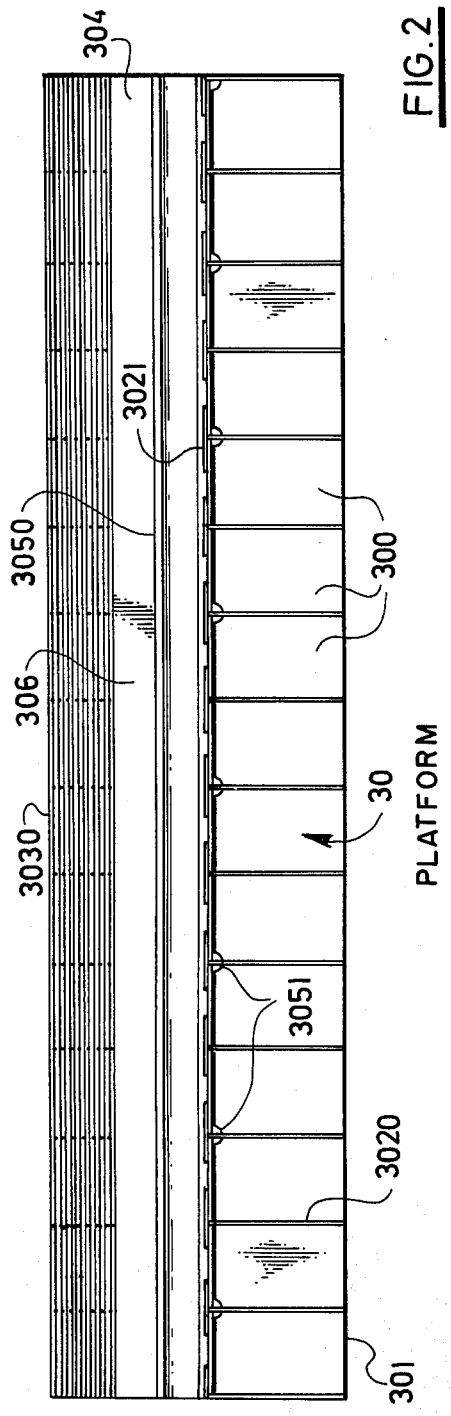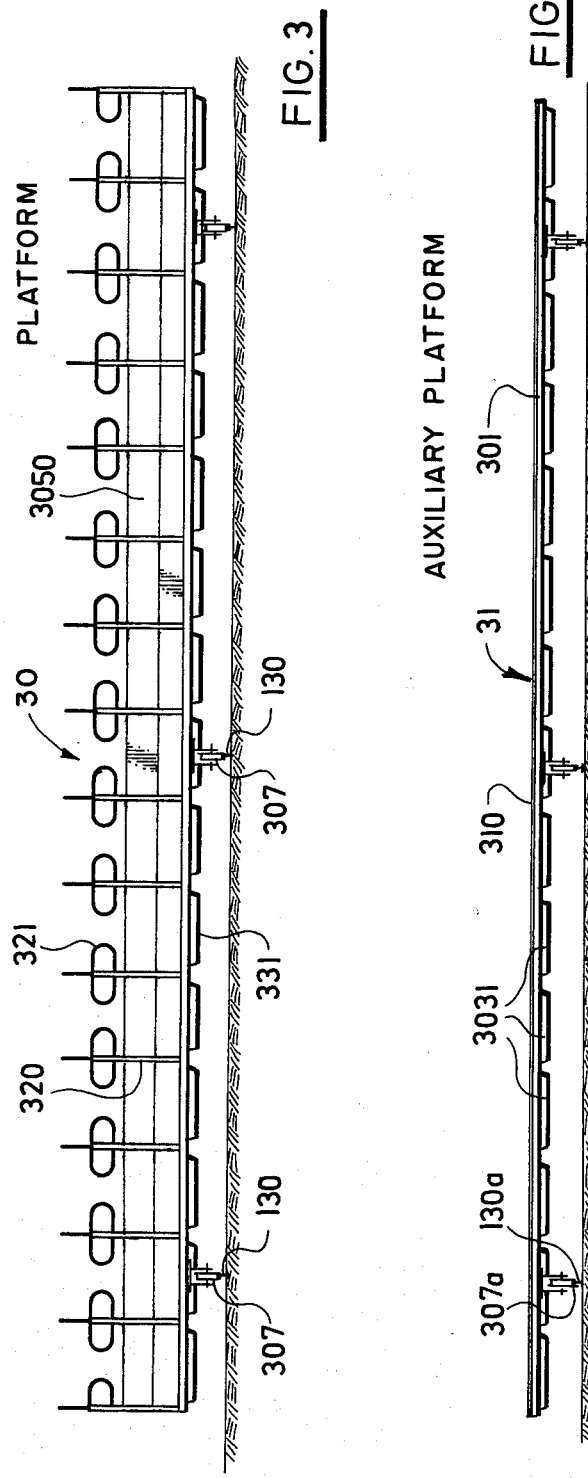

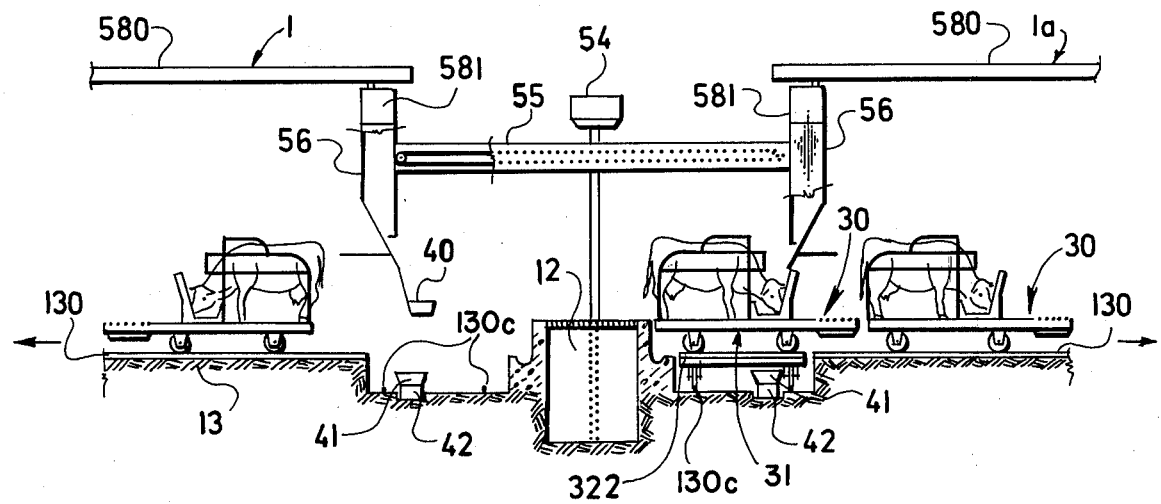
FIG. 9
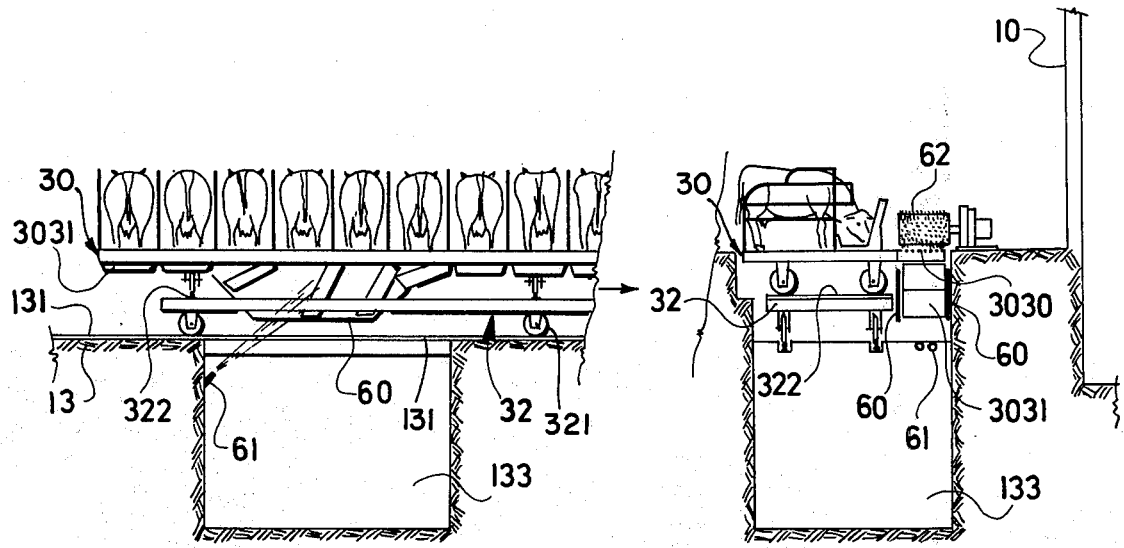
FIG. 10
FIG. 11

MOBILE ARRANGEMENT FOR A GROUP STABLING AND HANDLING OF FARM ANIMALS

The invention relates to a mobile arrangement for a group stabling and handling or treatment of farm animals, especially milk-cows.

BACKGROUND OF THE INVENTION

New methods in breeding of farm animals, e.g. a very high concentration, aim to increase production and to lower the needed attending time, to secure better conditions for materials, especially as to hygiene, and to decrease production costs. The high concentration of stabling causes difficulties which cannot be solved the the hitherto known systems of milk-cow stabling, whether it be a confining system or a free one. In cow-sheds, where a confining stabling system is applied, the possibility of individual treatment or handling of animals is better because of a better over-all survey and continuous individual inspection. Any disturbance of a herd does not come into question in a cow-shed, the possibilities of injuries to the animals are limited, and the percentage of animals lost because of a technological selection, e.g. caused by mutual suckling, is very low.

In free stabling a greater variability in mechanization of a working process may be applied, thus automatization units may be utilized. One may save labor and achieve higher working productivity with respect to binding or confining cow-sheds. But a drawback of confining cow-sheds resides in a relatively bad and limited possibility of applying more efficient mechanization, which also causes a low working productivity. Movements of the materials in the shed during the working time make the animals uneasy; this also limits a high concentration of animals in one cow-house. Free stabling in cow-houses causes troubles especially in the group treatment of animals, and in some cases even in a herd treatment. The breeding technology affects an increased disturbance in herds, because of the driving of animals into individual treatment centers, fighting for a place at a trough, etc. For such a stabling one needs more and more walled areas, which causes an increase of investment capital as well as of devices for the handling and storing of dung.

In the free stabling of horned cattle, there are difficulties with respect to special treatment e.g. insemination, veterinary treatment, etc. A continuous movement of animals in the herd may cause the spreading of infections, e.g. molds. In the system of free stabling, the animals are often injured during driving and moving, and some of them die. Also a mutual suckling of milk between cows may take place. Hitherto known systems of horned cattle stabling, with respect to the possibilities of increasing the stage of mechanization and automation, and with respect to the increase of the working productivity, have not sufficient reserves for further development.

In many countries there have been searches for new ways for effective breeding, as well as for the stabling of milk-cows. A direction of the next development aims at a thorough industrial working process, i.e. to an application of a continuous process of production, wherein a milk-cow is transported to individual treatment centers.

One step in this development was reached by a Swedish concern, Alfa-Laval, with a system called "Unicar". There the cows are situated in individual boxes or stands which are connected in a chain or train moving on rails. On a stabling two-axis pallet there is installed a feeding trough, a drinking device with a water tank, and a tank for dung. The Unicar system consists of two sections, viz. a parking area and a treating area. Most of the time the milk-cows are stabled in the parking area, except for times when they are milked, fed, etc. These operations are carried out in centers situated in the treating area along the path of the mobile stands or boxes. When the working cycle is over, the pallets return to their places in the parking area. In the USSR, there has been designed a cow-house with the treatment of milk-cows in movable confinement. In such cow-house the milk-cows are confined to a feeding transporter which moves along the circumference of the cow-house. Thus the milk-cows are automatically brought to the sites of udder washing, milking, feeding, cleaning, and then are transported back to the initial place. Such system employs a "running belt" stabling princliple; it may not be advantageous for high-capacity conditions, but it may be useful for reconstructed cow-houses.

In the Academy of Science in the USSR, there has been designed a round transporter cow-house. In fact it is a round transporter with two rows of installed stands provided with a center trough. Channels for urine and dung are situated in the sides of the stands. Dung is removed by means of stable scrapers. By rotating the round transporter, milk-cows are transported to the milk-room, before which a feeding device for corn food is installed. After milking is over, forage is delivered. A similar conception may be found in a Czechoslovak design of a mobile round cow-house for milk-cows. Here, the previous idea is enlarged in a system of two up to four cow-houses of this type, mutually connected with one central milk-house. All of the above-mentioned systems of mobile stands up to now have not been worked out technologically, and only in several cases have models of such cow-houses been built. The results of tests have not been available for the construction of full-scale cow-houses.

SUMMARY OF THE INVENTION

Some of the above-mentioned disadvantages of the prior art are obviated by a mobile arrangement for a group stabling and treatment of farm animals according to the present invention. In accordance with a preferred embodiment of the invention, cow-house bays, which are separated one from the other by means of a milking room and of a channel covered with a grid, there are situated—on the stable floor-platform rails for supporting and guiding movable platforms with individual stabling stands. In front of the stands a feeding trough is situated, and disposed normal to the platform rails, at both ends of the cow-house bays, there are situated trailer rails, advantageously on a lowered stable floor. On the said trailer rails there are disposed the wheels of trailers; the trailers consist of a frame into which a trailer floor is built-in. On the said trailer floor there are transversely seated rails in the same horizontal plane as the platform rails. On movable platforms there are tanks for drinking water which are fixed to the feeding troughs, the said tanks being connected to drinking devices situated in the front part of the stabling stands. Manipulation corridors are built in the movable platforms in front of the feeding troughs; in the side part of the movable platforms there are situated grids for dung and under them dung tanks are tiltably disposed. In the cow-house bay, an auxiliary platform is arranged between the movable platforms, and on its frame a flat plate is seated, in the front part of which a dung grid is situated and under it a dung tank is fixed.

The arrangement according to the invention combines the advantages of confining or binding systems of stabling with those which enable the application of mechanization and automation over a great range. It also obviates some of their drawbacks. The arrangement makes it possible to decrease considerably a roofed area of the cow-house with respect to one stand, because an auxiliary area is limited to a minimum. When building up the cow-house and installing technological equipment, the percentage of workshop and cereal or fodder preparation of the building is increased, thus one saves labor and building material for the underground part of the building, and the whole construction is accelerated. A building-brick or modular system makes it possible to employ a number of similar elements; this results in a decrease of capital investment and the cost of individual elements.

A technological system and the modular arrangement permit the design of a cow-house provided with equipment according to the invention on several floors; this diminishes the ground space required. The arrangement makes it possible to improve the overall survey of a herd, and to change a herd treatment of animals into a group treatment or to an individual one. A better inspection of the health of the animals is also evident. With respect to large-capacity cow-houses, the percentage of a technological selection is diminished, as well as the number of animals removed from the technological production process because of their injuries. The arrangement makes it possible to apply automation and computer techniques for controlling the working operations, and for reaching higher working productivity with labor saving. All these advantages result in diminishing the costs for a unit of production. But at the same time this system improves the working conditions, the safety of work, and the living conditions of the animals. The system may also be applied when modernizing some old cow-houses.

The system also enables the utilization of all possibilities offered by genetic material to reach a high effectiveness with a low consumption of food, e.g. by the fact that a forced movement of milk-cows from the stands to a milkroom and back, which disturbs milkcows, is omitted. Such movement results in the consumption of biological energy, and in this way in a decreased utility. This forced movement of milk-cows also requires several workers. The binding or confining system, which is employed in the invention, also prevents milk loss, which formerly took place in waiting rooms before the milk room by the dropping of milk from udders. The binding system according to the invention also prevents cows from mutual milk suction or suckling, which takes place not only in free stabling but also in binding stabling, viz. in the waiting room before milking. The power input of the whole system for one milk-cow is comparable with that of a binding cow-shed employing the simplest stabling of milk-cows. The arrangement of milk cows in the cow-house of the present invention provides an ideal for biological treatment materials to carry out their work.

DESCRIPTION OF THE DRAWINGS

In order that the invention may be clearly understood and readily carried into effect, a preferred embodiment thereof is, by way of example, hereinafter more fully described and illustrated in the accompanying drawings, in which:

FIG. 1 (sheet 1) is a view in plan of the whole arrangement of a first preferred embodiment in accordance with the invention;

FIG. 2 (sheet 2) is a view in plan of a movable platform;

FIG. 3 (sheet 2) is a view in elevation of the back of the movable platform of FIG. 2;

FIG. 6 (sheet 2) is a back view of an auxiliary platform;

FIG. 7 (sheet 1) is a view in plan of a trailer;

FIG. 8 (sheet 1) is a side view of a trailer;

FIG. 9 (sheet 4) is a view in vertical section through the middle part of the cow-house; the section being taken along the line 9—9 in FIG. 1;

FIG. 10 (sheet 4) is a back view of a movable platform when emptying dung tanks, the view being taken from line 10—10 in FIG. 1;

FIG. 11 (sheet 4) is a side view of a movable platform when emptying dung tanks, the view being taken from line 11—11 in FIG. 1;

DETAILED DESCRIPTION OF THE INVENTION

Figure 4:
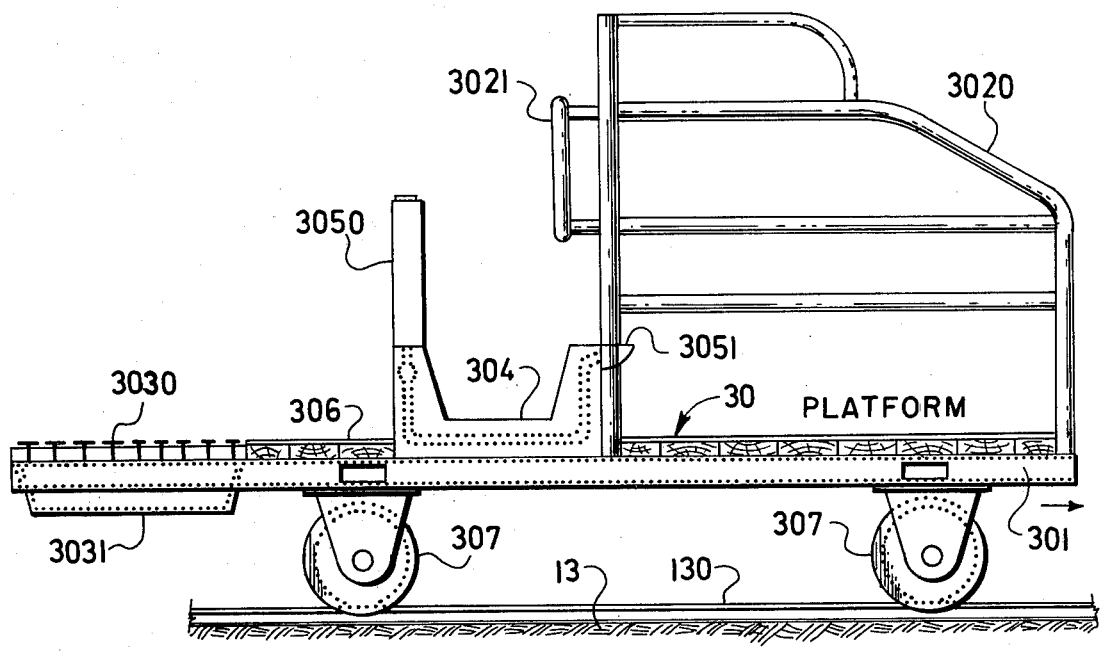
FIG. 4 (sheet 3) is a view in side elevation of a movable platform.

Turning first to FIG. 1, a mobile arrangement for a group stabling and treatment of farm animals is shown installed in a first cow-house bay 1 and in a second cow-house bay 1a, which are disposed lengthwise of an enclosure or building having walls 10, the bays being separated by a cross partition. The cow-house bays 1 and 1a are advantageously separated longitudinally by means of a wall 11. A milk-room 2 and a channel 12 covered with a grid are situated between the cow-house bay 1 and cow-house bay 1a. Longitudinal platform rails 130 (FIGS. 3-6) for supporting and guiding movable platforms 30 are seated longitudinally on a cow-house floor 13 (FIG. 4) in both parts of the cow-house bays 1 and 1a. Transverse trailer rails 131 (FIGS. 1 and 8) on which wheels 321 of trailers 32 are seated, are seated on a lowered cow-house floor 13 at both ends of the cow-house bays 1 and 1a normal to the longitudinal platform rails 130. The trailers 32 (FIGS. 7 and 8) consist of a frame 320, into which a floor 323 of the trailer is built-in; on this floor 323 there are situated horizontal rails 322 disposed as the same level as and link up with the platform rails 130. Pits (FIGS. 10 and 11) 133 for receiving dung are provided in the cow-house floor 13 at the outer ends of the cow-house bays 1 and 1a.

An auxiliary store 132 for feed links up with the middle part of an undrawn stable; the auxiliary store 132 is provided with a feed transporting worm 50, with which a pit 51 is connected, and a lift transporter 52 with a layer leveller 53. The platforms 30 carry frames 301 which define the rear limit of the stable stalls. Movable wheels 307 (FIGS. 3 and 6) of the movable platforms 30, on which individual stable stands 300 are disposed, are seated on the platform rails 130. The stable stands 300 are limited in a sidewise direction by box railings 3020, which are provided in the front part with chest stops 3021 (FIG. 4). In front of the chest stops 3021 on the frame 301 of the platform there is situated a feeding trough 304 to which all along its length there is affixed a tank 3050 for drinking water, tank 3050 being connected by means of piping, shown in dotted line in FIG. 4, to drinking devices 3051 situated in the front part of the feeding trough 304. In the rear half of the frame 301 a corridor 306 is provided behind the feeding trough 304, and to left of that corridor 306 (FIG. 4) there is a dung grid 3030, under which dung tanks 3031 for individual stabling stands are tiltably mounted.

An auxiliary platform 31 (FIGS. 1 and 5), which is seated on rails 130a by movable wheels 307a and on its frame has a flat area 310, which is situated between mutually unconnected movable platforms 30 in each cow-house bay 1 and 1a. One end of auxiliary platform 31 there is built-in a dung grid 3030 for cows stabled on the next movable platform 30. When the arrangement is not functioning, the auxiliary platforms 31 are situated at the milking-room 2.

A cross feed transporter 54 (FIG. 9), ducting in the area of the cow-house and discharging into a reversed feed transporter 55, links up with a feed lift-transporter 52 (FIG. 1) located in the auxiliary feeding store 132. The reverse transporter 55 is provided on both ends with chutes 56 (FIG. 9). The chutes 56 are advantageously fixed under feeders 581 for corn feeding, into which en masse conveyors 580 discharge feed such as corn from feed storing tanks 57. In cow-house bays 1 and 1a (FIG. 1), near the milking-room where are situated devices 59 (FIG. 1) for delivering drinking water to drinking water tanks 3030 (FIG. 3), situated on movable platforms 30. In cow-house bays 1 and 1a a device 40 (FIG. 9), for cleaning feeding troughs 304 is installed, under which there is disposed a belt transporter 42 which discharges outside the cow-house area.

Figure 12:
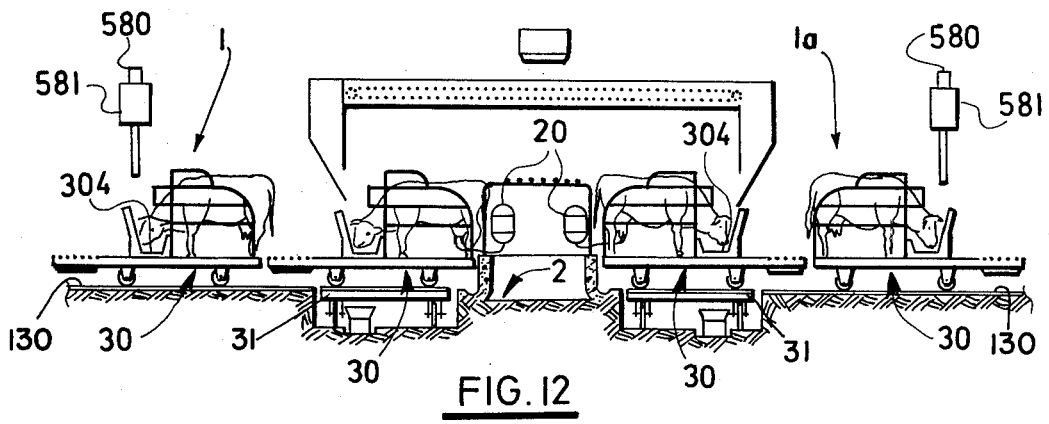
FIG. 12 (sheet 5) is a view in cross-section looking into the area of a milk-room.
Figure 16:
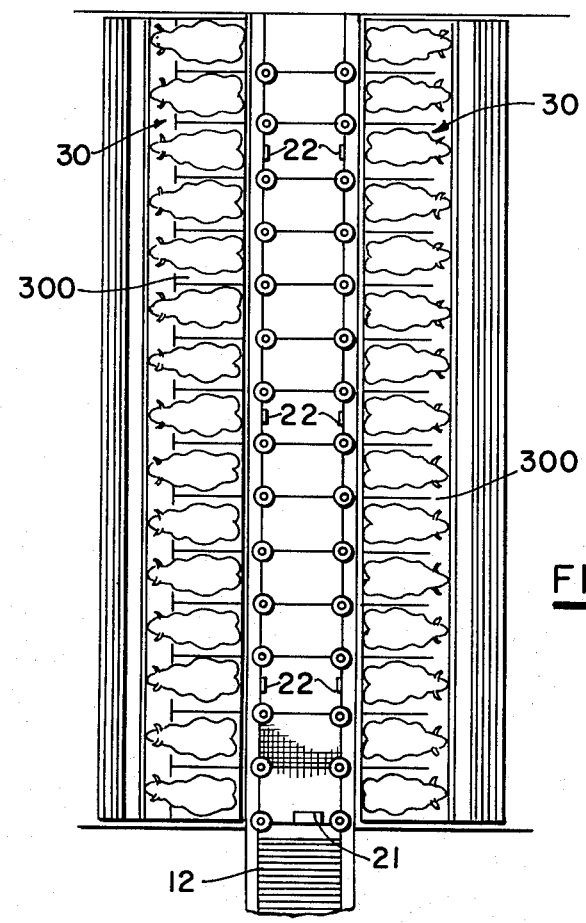
FIG. 16 (sheet 6) is a view in plan showing switches which control the movements of the trailer, and the control panel of the dosers for corn food in the area of the milk-room.

The milking-room 2 is provided with milking sets 20 (FIG. 12), a control panel 21 (FIG. 16) for corn feed dosing, and with dispatch switches 22 for travel of the trailer 32 (FIG. 8), movable platforms 30 and auxiliary platforms 31. Over a trap-pit 133 (FIGS. 10 and 11) there are disposed guides 60 for tilting dung tanks 3031, and under the guides 60 there are arranged nozzles 61 for discharging rinsing water. Over the trap-pit 133 there is situated a brush 62 (FIG. 11) for finish cleaning of dung grids 3030 of the movable platforms 30 and auxiliary platform 31.

One end of the trailers 32 is connected to an unending chain or rope 72, which is led to a reversible motor connected to a sprocket 70 (FIGS. 1 and 13), from which its lower run leads transversely of the cow-house to a guiding pulley (not shown) and from it the chain leads through a guide channel 73 to the other end of the trailer 32 to which it is fixed. Driving units each consisting of a reversible motor (not shown) with a pinion 70 and of a rack 71 (FIG. 13) with a pawl 74 are installed in the cow-house bays 1 and 1a for travel of the movable platforms 30. The drives for the auxiliary platforms are similar to those for the trailers.

Figure 5:
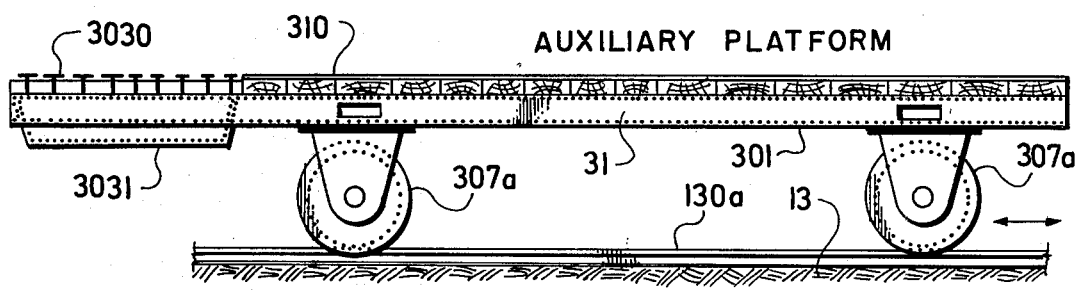
FIG. 5 (sheet 3) is a view in side elevation of an auxiliary platform.

The cow-house bays 1 and 1a with their technological equipment are mirror images of each other; the same is true of the travel of the platforms in the respective bays 1 and 1a. On the transverse control axis of the combined bays 1 and 1a there is a milking-room 2 and a channel 12 covered with a grid. The milk-cows are stabled the movable platforms 30 in the bays 1 and 1a so that the treatment processes may be carried out at approximately the same time on both sides of the milking room 2 by a centrally disposed work force. For ease of milking, the cows in the bays 1 and 1a are stabled in opposite directions on the respective platforms 30, the cows in bay 1a facing to the right, and the cows in bay 1 facing to the left. In time of standstill, i.e. between individual treatment cycles, the auxiliary platforms 31 provided with movable platforms 30 loaded with animals, are situated on both sides of the channel 12 covered with a grid (FIG. 9). The lowered cow-house floor 13 for the auxiliary platform 31 at the milking room 2 is left free on both sides. In this position the milk-cows which are stabled in the movable platform 30 which is then on the auxiliary platform 31 void into the gridded channel 12. At standstill, the free area, to the left and right of the milking room 2 in the lower part of FIG. 1 there are situated towards the bays 1 and 1a of the cow-house the auxiliary platforms 31 and beyond it individual, mutually unconnected, movable platforms 30 up to the free cow-house floor 13 for the trailer 32 at the end face walls of the circumferential enclosure 10 of the cow-house bays 1 and 1a. In the upper half (FIG. 1) of the cow-house bays 1 and 1a, there are situated unconnected movable platforms 30 with stabled milk-cows; at the end walls of the circumferential enclosure the trailers 32 stay free, that is, no platform 30 is disposed on them. The movable platforms 30 and the auxiliary platforms 31 are made so that the milk cows always void onto a dung grid 3030 of the adjacent movable platform 30 and auxiliary platform 31 (FIGS. 4 and 5). This arrangement of the movable platforms 30 and auxiliary platforms 31 permits the milk-cows to be disposed up to the end of the movable platforms 30, and, in this way, to shorten the distance between the milk-cow and the milking set of the milking room 2.

During operation of the arrangement, both trailers 32 move on the lowered floor 13 parallel to each other and transversely of the cow-house bays 1 and 1a at the ends thereof; one of the trailers always carries a movable platform 30 and the other one is free. The same is true of the auxiliary platforms. During a reverse motion (downward in FIG. 1) of the first trailer 32 it is free and the second trailer is loaded. The movable platforms 30 move in a longitudinal direction over platform rails 130, the auxiliary platforms 31 move transversely over auxiliary platform rails 130a, and each of the trailers 32 moves transversely over trailer rails. The number of platform rails 130, the number of pairs of wheels of the movable platforms 30 and of course also the number of trailer rails 322 depend upon the number of stabling stands 300 on the movable platform 30 and upon its length. The disposition of the platform rails 130 and the trailer rails 131 is mutually perpendicular and different as to height, corresponding with the height of the trailer 32. The trailer rails 322 at the termini of travel of the trailers 32, always form a continuation of the platform rails 130; this permits travel of the movable platforms 30 from the trailers 32. The same conditions prevail as to the positioning of the tracks on the auxiliary platforms relative to the tracks 30 for platforms 30. The rail system is fixed onto the cow-house floor 13.

The treatment process is started by the milking staff from the working site of the milking room 2, from which, by means of dispatch switches 22 (FIG. 16), there is started a travel cycle of the movable platforms 30, including the auxiliary platforms 31 and trailers 32. In the first phase, both rows of the movable platforms 30 are pushed away from the central gridded channel 12; in this way the auxiliary platforms 31 in the center of the cow-house are loosened, and they return free in the area of the milking room 2 into the position thereof, shown in FIG. 1. Simultaneously, trailers 32 at the end walls of the enclosure 10 travel and they, transport the movable platforms 30, which came to be adjacent to them by means of the previous motion cycle, that is, which are the first in the lower rows (FIG. 1). In the second (upper) rows of the movable platforms 30 in the cow-house, the platforms 30 nearest the transverse center of the cow-house are shifted into the area of the milking room 2 by the auxiliary platforms 31. The cycle of the first phase is repeated, so that at the end of this cycle the movable platforms 30, which were shifted by the previous cycle of motions to the first position in the second rows of the cow-house, are pushed into the area of the milking room 2.

The position of the milk-cows is perpendicular with respect to the milking room 2, and with respect to the technological arrangement of the movable platforms 30, the backs of the milk-cows are situated at the working area of the milking room 2 within the optimum reach of the milking staff. The working "milking" operation, is continued to next working operations such as feeding, removing of the superfluous feed etc. In the milking room 2 there are provided as many milking sets 20 on each side as there are stabling stands 300 on the movable platforms 30. The milking sets 20 are installed in a line perpendicularly to the longitudinal motion of the movable platforms 30, without the use of shaped railings, since the hoses of the udder holders are led between the back legs of the cows. In the milking room area, besides the typical layout of a milking room there is situated a control panel 21 (FIG. 16), and on each side of a milker there are situated control switches 22. The milkers carry out all operations according to recognized zootechnical conditions for milking before the milking proper, of the milk-cows on one side of the milking room 2.

By applying one milking set 20 after the other on the udders of the milk-cows, the milking process proper starts. The treatment of animals, which are in the care of one milker in the respective area, having been completed, the preparation and milking of milk-cows which also were shifted into the area of the milking room 2 is then carried out on the other side of the milking room 2. The time needed for this work corresponds with the time needed for milking the first group of milk-cows, so that the treating staff may continue to take off the milking sets 20 and to treatment of the udders after milking in the same manner as with the first group of cows. After having finished the treatment of this first group of milk-cows, the milker pushes down a control switch 22 at his location and proceeds to finish the milking of the second group of the milk-cows.

The movable platform 30, on which the first group of milk-cows were situated, is locked from movement until all control switches 22 on the respective side of the milking room are pushed down. Then the whole system in the cow-house bay 1 is automatically put in motion to prepare a next group of milk-cows for a working operation. During this time the workers finish the milking process of the second group of animals, and by pushing down all control switches 22 on this side, they put in motion the system of the second cow-house bay 1a. The work of the treating staff during milking goes on by connecting the treatment of animals from both cow-house bay 1 and 1a, so that during the milking proper of one side of the milking room 2 there is prepared or finished the work concerning a milk-cow group on the other side, and vice versa.

During the milking process of a cow group, the shift-master in the milking room 2 sets up the quantity of corn feeding on the control panel 21 destined to be fed to this group according to their needs. Alternatively the amount of feed can be controlled by a computer. The processes of cleaning of the feeding troughs 304, of delivering forage and corn fodder, of filling the tanks 3050 with drinking water, of removing solid and liquid dung from dung tanks 3031, as well as other necessary processes go on automatically during the motion of the movable platforms 30, and also during a standstill of their phase movement. The transverse motion of the movable platforms 30 seated on the auxiliary platforms 31 in the area of the milking room 2 and the gridded channel 12 is utilized for cleaning the remainders of feed from the feeding trough 304. Cleaning equipment 40 (FIG. 9) is built into the supporting structure, fixed in a wall partition 11 over auxiliary platform rails 130a. It is designed as a scraper, the upper part of which is stiff and the lower part, which corresponds with a profile of the feeding trough 304 is elastic. The adjustment of the scraper, which is stationary, is adjusted to the side so that it may pass through the feeding trough 304 from the milking room 2 to the gridded channel 12 during a transverse motion of the movable platforms 30 and so that it working elastic part may hold back remainders of fodder. The height of the working position of the scraper is mechanically adjustable. After the scraper has passed the whole length of the feeding trough 304 from one terminus of the auxiliary platform motion to the other, the fodder remainders are drawn into the feeding hopper 41 of the belt transporter 42 seated between auxiliary platform rails 130a. The belt transporter 42 transports fodder remainders outside the cow-house.

The transverse motion of the movable platform 30 from the milking room 2 is also used for laying down forage. A homogenized fodder is drawn from a fodder store area 132 into the working area of a feeding worm 50, which delivers it into the pit 51 of the lift transporter 52. Uniform doses are secured by means of a layer leveller 53, which returns superfluous fodder back into the pit 51. After having fallen onto the cross transporter 54, which has a one-direction motion, fodder is transported into the middle of a perpendicularly situated reverse transporter 55, which serves for delivering fodder into both cow-house bays, from which it is directed by chutes 56 into the feeding troughs 304 of the transversely moving movable platforms 30. The quantity of a dose of forage depends upon the speed of the cross motion of the movable platform 30 and upon the speed and height of the fodder layer on the transporter system. With a constant speed of motion of the movable platforms 30 and of the transporter system, the does of forage is controlled only by the height of fodder layer.

In case of the group dosing of corn fodder, the delivery of forage is carried out simultaneously. Corn fodder is stored outside the cow-house in a store 57 of corn fodder, from which it is transported by means of en masse conveyors 580 and dosers 581 to the ends of the reverse transporter 55 and with simultaneous motion they are mutually mixed on a chute 56 together with forage. The quantity of corn fodder delivered may be any one of several different doses variable during the working operation. In case of the need of an individual dosing of corn fodder, which is delivered before milking, the en masse conveyors 500 and dosers 581 are directed in the area over the feeding troughs 304 of the second movable platforms 30 upstream of the milking room 2; the dosers proper 581, controlling the doses for each milk-cow, may be controlled automatically or by the milker. In this case, the milk-cows eat corn fodder before the feeding proper and during the milking process.

In the second position of the movable platforms 30, in the direction in which it travels away from the gridded channel 12, in the wall partition 11 there is a built-in device for filling the drinking water tanks 59. In this technological center a drinking water stock is automatically filled up to a constant quantity which is sufficient for all milk-cows situated on the movable platforms 30 until next filling up with drinking water during next motion of the platforms 30.

Solid and liquid dung, which are accumulated under steel grids 3030 in tanks 3031, are removed during the cross motion of the movable platforms 30 by the trailers 32 and adjacent the end walls of the enclosure 10. During such motion, each tank 3031 is tilted over the dung pit 133 and in this way the tank 3031 is emptied. Solid and liquid dung are removed from the tilted tank 3031 by gravity. A successive tipping and return of the tank 3031 are ensured by shaped guides 60. In the dung pit 133, there are situated nozzles 61 (FIG. 10) for delivering pressure water for rinsing the dung tanks 3031 when necessary. The dung grids 3030 are simultaneously rinsed, cleaned and brushed with a brush 62 (FIG. 11) under which the movable platforms 30 move. The whole process of cleaning and rinsing is completely mechanized.

Figure 13:
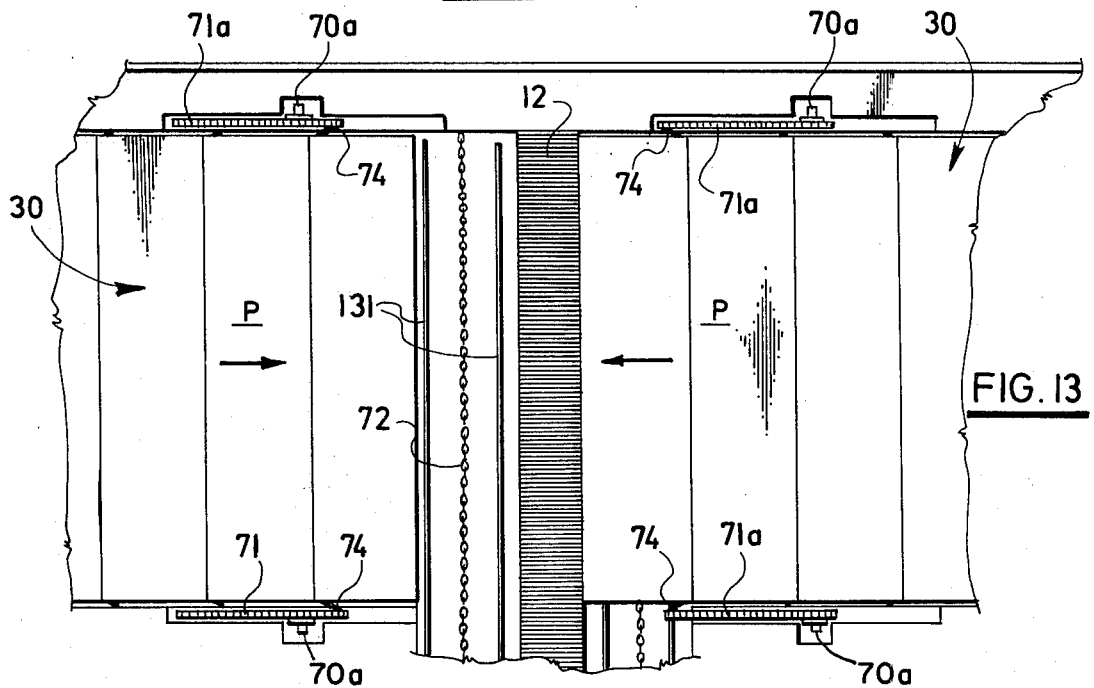
FIG. 13 (sheet 5) is a fragmentary view of the driving mechanism for the movable platforms.

The mechanism for shifting the movable platforms 30 stepwise in a direction longitudinal of the cow-house is shown in FIG. 13. Each bay 1 and 1a is provided with two pushers P, one in line with each longitudinal row of platforms 30. Each pusher P has a rack gear 71a on its opposite side edges. On each side of the path of travel of the respective auxiliary platforms 31 there are positioned a pair of co-synchronized reversible stepping motors (not shown) which drive pinions 70a which mesh with racks 71a. The pushers P operate in succession, and are moved in both directions through a distance equal to the width of one movable platform 30. A catch or pawl 74 catches always in the direction of motion the last movable platform 30 in the row, and by it the whole movable half of the cow-house bays 1 and 1a is pushed through one position.

Figure 14:
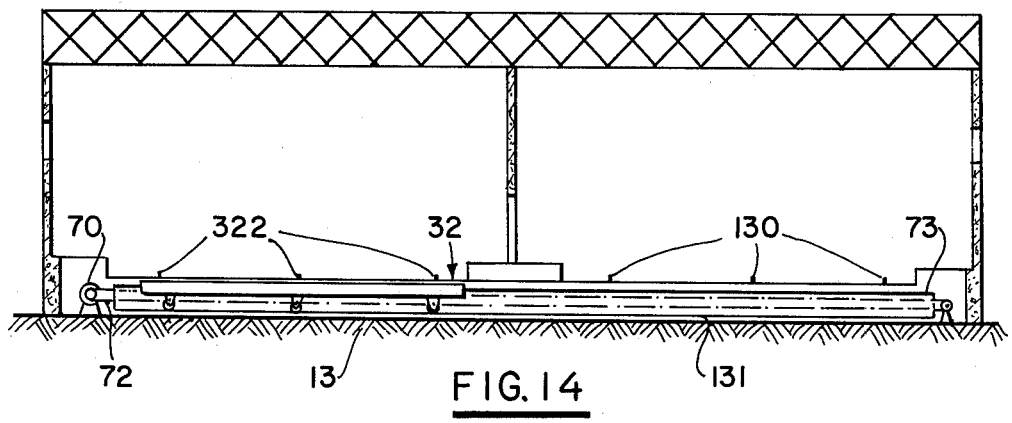
FIG. 14 (sheet 6) is a side view of a chain drive for the transverse movement of a trailer.

In FIG. 14 there is schematically shown in a side view a chain drive for the transverse movement of a trailer 32. A reversible motor 70 drives a sprocket through a suitable gearing mechanism, an endless chain 72 being entrained about such driven sprocket and an idle sprocket at the other end of the chain. The trailers 32 are affixed to the upper run of the chain 72 at one place on the chain. The upper run of the chain is housed beneath a cover member 73 which has a slot therein above and parallel to the upper run of the chain to allow the passage therethrough of the connection between the upper run of the chain and the trailer 32.

Figure 15:
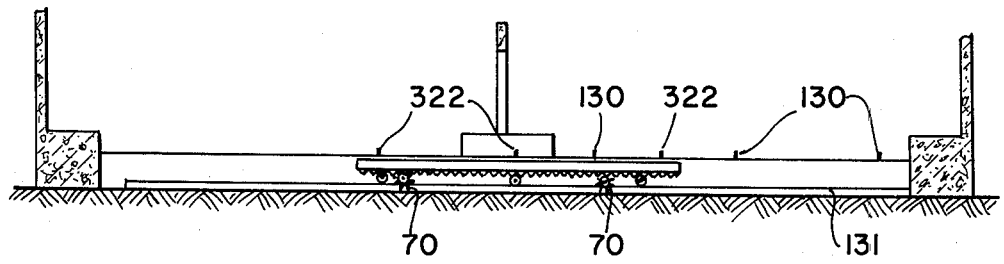
FIG. 15 (Sheet 6) is a side view of an alternative drive for a trailer such drive employing a rack and a pinion meshing therewith.

FIG. 15 shows an alternative manner of reciprocably driving a trailer, which is here designated 32a. Trailer 32a is reciprocated in a manner similar to the pushers P, as shown in FIG. 13. Thus, trailer 32a has a rack 71b affixed to the bottom thereof, a plurality of synchronously driven pinions 70b meshing with the rack 71b. Pinions 70b are reversibly driven by driving means (not shown).

Figure 17:
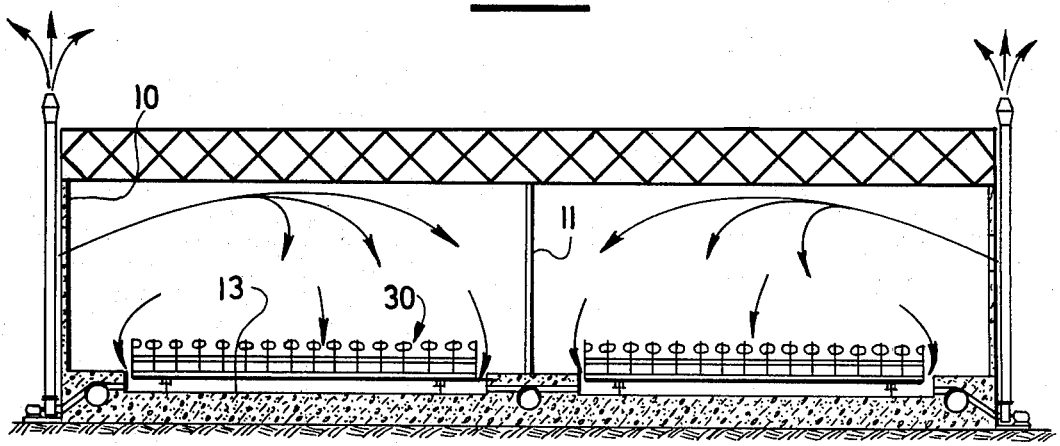
FIG. 17 (sheet 3) is a view in transverse cross-section in the area of the cow-house depicting the changing of air.

The cow-house is ventilated by a forced equi-pressure system (FIG. 17), by which fresh air is delivered from the under-roof area and exhausted from the area under the movable platforms 30.

Figure 18:
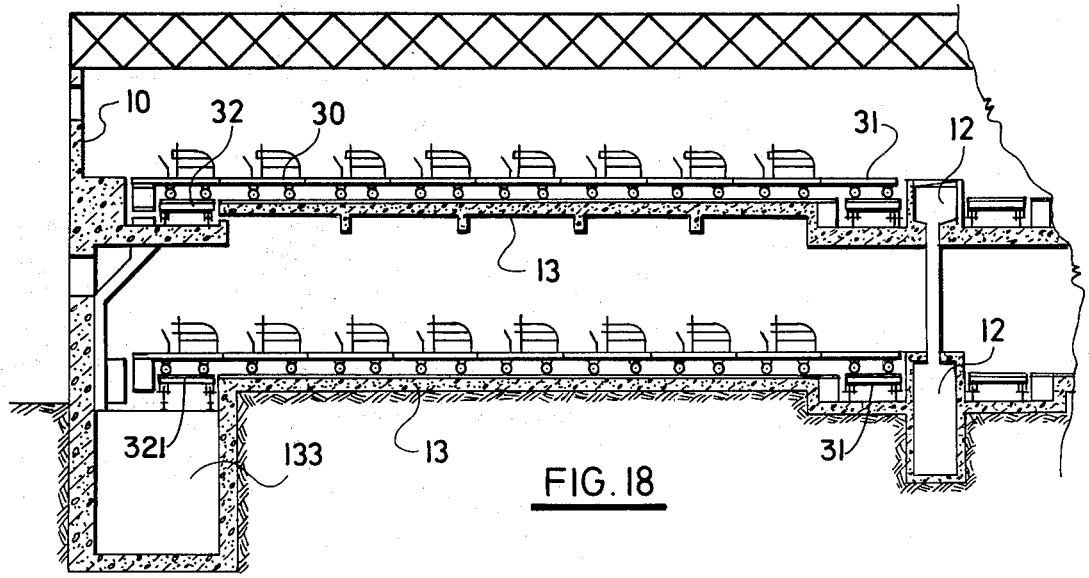
FIG. 18 (sheet 5) is a side view of a second embodiment of the arrangement in accordance with the invention, such arrangement employing two floors.

The movable platforms 30 may be used especially for the stabling of small breeds or young animals, and also as transport pallets from one shed into the other one, to a slaughterhouse, etc. In such a case, the movable platforms 30 go from the trailer 32 onto a transport means, and it is not necessary for animals to be shifted in any way. After animals have left the movable platform 30, the platform is cleaned, disinfected and returned into the moving cycle of the cow-house. In a cow-house provided with movable platforms 30 one may carry out an individual treatment of milk-cows and of groups of cattle of other ages as well as farm animals in general; for their treatment the movable platforms are well adapted, as are the individual technological centers during the transport of animals in the cow-house. An individual treatment of animals may also be carried out, in connecting the technological process to a computer; this ensures an optimum technical activity of all machine aggregates and a maximum biological productivity of the treated animals. A cow-house arranged according to the invention makes it possible to design it as a several-floor building as shown in FIG. 18; in this case all floors are interconnected with technological centers of animal treatment. The same activities on the various floors, e.g. removing of solid and liquid dung, transport of milked milk into one milk tank, etc., can readily be integrated, as is indicated in FIG. 18 in connection with dung removal.

Although the invention is illustrated and described with reference to one preferred embodiment thereof, it is to be expressly understood that it is in no way limited to the disclosure of such a preferred embodiment, but is capable of numerous modifications within the scope of the appended claims.

We claim:

1. A mobile arrangement for the confining stabling and treatment of a plurality of milk producing farm animals, comprising an enclosure with two similar rectangular bays disposed in mirror relationship, each bay having two sets of longitudinally extending rails, the sets of rails of each bay being parallel to and spaced from each other, the two sets of rails extending normal to the imaginary plane separating the two bays from an inner terminus adjacent such plane and an outer terminus removed from such plane, a milking room extending along said plane, a plurality of elongated platforms each having a plurality of confining stalls thereon extending transversely of the length of the platform, means for advancing the platform in each bay transversely of their lengths along a first set of longitudinally extending rails in a direction outwardly away from said plane to the outer terminus of the first set of rails, means for transferring the platforms in the direction of their length from the outer terminus of the first set of rails to the outer terminus of the second set of rails, means for advancing the thus transferred platforms in a direction transversely of their lengths along the second set of rails in the direction inwardly to the inner terminus of the second set of rails, and means for moving the platforms at the inner terminus of the second set of rails in the direction of their lengths to the milking room and thereafter transferring them to the inner terminus of the first set of rails, the platforms retaining the same orientation in space throughout their travel from the first terminus of the first set of rails to their return to said first terminus of the first set of rails.

2. The arrangement according to claim 1, wherein the stalls on the platforms are so constructed and arranged as to confine the animals with their heads pointing away from said imaginary plane.

3. The arrangement according to claim 2, wherein the platforms in the respective bays are so spaced from each other at the milking room that the animals on opposing platforms can be sequentially milked by the same milking equipment.

4. The arrangement according to claim 1, wherein the means for transferring the platforms from the outer terminus of the first longitudinal set of rails to the outer terminus of the second set of longitudinal rails, and the means for transferring the platforms from the inner terminus of the second set of rails to the milking room and thereafter to the inner terminus of the first set of longitudinally extending rails comprise transversely reciprocable carriages which receive the platforms, said carriages having rails thereon which are selectively aligned with the first set of longitudinally extending rails and with the second set of longitudinally extending rails.

5. An arrangement as in claim 1, wherein each platform has a feeding trough disposed thereon in front of the animal in each stall, and each platform has a tank for drinking water affixed to the feeding troughs, the said tanks being connected to the drinking devices disposed in the front parts of the platforms.

6. An arrangement according to claim 1, comprising a grid cover dung receiving channel extending along said imaginary plane in alignment with the milking room.

7. An arrangement as in claim 1, comprising manipulation corridors built into the movable platforms in front of the feeding troughs, and grids for receiving dung in the side part of the movable platforms, and tiltably situated dung tanks disposed beneath said grids.

8. An arrangement as in claim 1, wherein in each cow-house bay there is an auxiliary platform disposed between the movable platforms, the auxiliary platform having on its frame a flat plate in the front part of which there is disposed a dung grid, beneath such grid there being a fixed dung tank.

* * * * *